US010179609B2

(12) United States Patent
Stenzenberger et al.

(10) Patent No.: US 10,179,609 B2
(45) Date of Patent: Jan. 15, 2019

(54) ARRANGEMENT OF A REAR AXLE MODULE ON A VEHICLE BODY, AND A REAR AXLE MODULE FOR SUCH AN ARRANGEMENT AND A TWO-AXLE, TWO-TRACK VEHICLE WHICH IS AT LEAST PARTIALLY DRIVEABLE BY MEANS OF AN ELECTRIC MOTOR AND HAS SUCH AN ARRANGEMENT

(71) Applicant: Bayerische Motoren Werke Aktiengesellschaft, Munich (DE)

(72) Inventors: Alfred Stenzenberger, Fuenfstetten (DE); Andreas Gleser, Groebenzell (DE); Lars Witta, Olching (DE); Steffen Kuehlewind, Seefeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 132 days.

(21) Appl. No.: 14/959,436

(22) Filed: Dec. 4, 2015

(65) Prior Publication Data

US 2016/0083012 A1 Mar. 24, 2016

Related U.S. Application Data

(63) Continuation of application No. PCT/EP2014/059997, filed on May 15, 2014.

(30) Foreign Application Priority Data

Jun. 6, 2013 (DE) .................. 10 2013 210 576

(51) Int. Cl.
*B62D 21/11* (2006.01)
*H01M 2/10* (2006.01)
(Continued)

(52) U.S. Cl.
CPC .............. *B62D 21/11* (2013.01); *B60K 1/00* (2013.01); *B60K 1/04* (2013.01); *H01M 2/1072* (2013.01);
(Continued)

(58) Field of Classification Search
CPC ... B60K 1/04; B60K 2001/0438; B62D 21/11
See application file for complete search history.

(56) References Cited

U.S. PATENT DOCUMENTS

| 5,611,569 A | 3/1997 | Sekiguchi et al. | |
| 7,703,565 B2 * | 4/2010 | Ikenoya | B60G 3/20 180/65.51 |

(Continued)

FOREIGN PATENT DOCUMENTS

| DE | 10 2008 047 705 A1 | 3/2010 |
| DE | 195 36 460 B4 | 3/2011 |

(Continued)

OTHER PUBLICATIONS

International Search Report (PCT/ISA/210) issued in PCT Application No. PCT/EP2014/059997 dated Aug. 20, 2014 with English translation (eight pages).

(Continued)

*Primary Examiner* — Katy M Ebner
(74) *Attorney, Agent, or Firm* — Crowell & Moring LLP

(57) ABSTRACT

An arrangement of a rear axle module on a two-axle, two-track vehicle which is at least partially electrically driveable by an electric motor is provided in which a rear axle bracket designed for the fastening of wheel-guiding links of a rear axle and a housing for accommodating components for providing electrical energy together form the module, with the housing arranged in a front region of the rear axle module. The rear axle module includes bearing brackets by which the module is connected from below to (Continued)

the vehicle body, including two rear axle bracket bearings which are to the rear of the rear axle module with respect to the direction of travel, two central rear axle bracket bearings arranged in a central region of the rear axle module, and two front bearings arranged on the housing in the front region of the rear axle module.

10 Claims, 8 Drawing Sheets

(51) Int. Cl.
    *B60K 1/04*     (2006.01)
    *B60K 1/00*     (2006.01)

(52) U.S. Cl.
    CPC ... *H01M 2/1083* (2013.01); *B60K 2001/0438* (2013.01); *H01M 2/1077* (2013.01)

(56) References Cited

U.S. PATENT DOCUMENTS

| | | |
|---|---|---|
| 2006/0289224 A1 | 12/2006 | Ono et al. |
| 2012/0199406 A1* | 8/2012 | Bender ............... B60K 1/04 |
| | | 180/68.5 |
| 2012/0255804 A1* | 10/2012 | Akoum ............... B60K 1/00 |
| | | 180/291 |
| 2013/0240273 A1* | 9/2013 | Langer ............... B60K 1/00 |
| | | 180/55 |
| 2014/0117654 A1 | 5/2014 | Buschjohann et al. |
| 2014/0262588 A1 | 9/2014 | Bruns et al. |
| 2016/0068195 A1* | 3/2016 | Hentrich ............ B60K 1/04 |
| | | 180/68.5 |
| 2016/0297289 A1* | 10/2016 | Ito ............... B60K 17/043 |
| 2016/0347159 A1* | 12/2016 | Perlo ............... B60K 1/00 |

FOREIGN PATENT DOCUMENTS

| | | |
|---|---|---|
| DE | 10 2011 012 249 A1 | 8/2012 |
| DE | 10 2012 011 797 A1 | 1/2013 |
| DE | 10 2011 081 836 A1 | 2/2013 |
| DE | 10 2011 054 580 A1 | 4/2013 |
| DE | 10 2012 005 997 A1 | 9/2013 |
| WO | WO 2012/065787 A1 | 5/2012 |

OTHER PUBLICATIONS

German Search Report issued in counterpart German Application No. 10 2013 210 576.2 dated Nov. 15, 2013 with partial English translation (10 pages).

Chinese-language Office Action issued in counterpart Chinese Application No. 201480032044.0 dated Jun. 2, 2017 with English translation (5 pages).

\* cited by examiner

ARRANGEMENT OF A REAR AXLE MODULE ON A VEHICLE BODY, AND A REAR AXLE MODULE FOR SUCH AN ARRANGEMENT AND A TWO-AXLE, TWO-TRACK VEHICLE WHICH IS AT LEAST PARTIALLY DRIVEABLE BY MEANS OF AN ELECTRIC MOTOR AND HAS SUCH AN ARRANGEMENT

CROSS REFERENCE TO RELATED APPLICATIONS

This application is a continuation of PCT International Application No. PCT/EP2014/059997, filed May 15, 2014, which claims priority under 35 U.S.C. § 119 from German Patent Application No. 10 2013 210 576.2, filed Jun. 6, 2013, the entire disclosures of which are herein expressly incorporated by reference.

BACKGROUND AND SUMMARY OF THE INVENTION

The invention relates to an arrangement of a rear-axle module on a vehicle body for a two-axle, two-track vehicle which is at least partially electrically driveable by an electric motor, wherein the rear-axle module has a rear-axle member designed for the fastening of wheel-controlling links of a rear axle, and has a housing for receiving components for providing electrical energy, wherein, in a state in which it has been arranged on the vehicle body, the housing is arranged in a front region of the rear-axle module and is fastened to the rear-axle member or forms a constituent part of the rear-axle member, and wherein the rear-axle module is attached to the vehicle body from below by way of two rear-axle member bearings, which are situated to the rear in the direction of travel and which are arranged in a rear end region of the rear-axle module, and by way of two middle rear-axle member bearings, which are arranged in a middle region of the rear-axle module.

The invention also relates to a rear-axle module for an arrangement of said type, and to a two-axle, two-track vehicle which is at least partially driveable by an electric motor and which has an arrangement of said type.

The provision of an adequate amount of electrical energy for a two-axle, two-track vehicle which is at least partially driveable by an electric motor constitutes a major challenge firstly with regard to the required structural space and secondly owing to the high additional weight of the components required for generating the electrical energy. In particular, there is a conflict of aims with regard to comfort, acoustics and driving dynamics. In order to implement an electric drive in abovementioned vehicles in a manner which satisfies requirements, that is to say in hybrid vehicles (driveable partially by an electric motor) or in purely electric vehicles (driveable only by an electric motor), it is necessary for the electrical components required for this purpose, that is to say the batteries for generating the electrical energy and the associated power electronics, to be accommodated in the vehicle, or arranged on the vehicle body, in the most weight-saving or weight-optimized and structural space-saving or structural space-optimized manner possible.

From the prior art, for example from German patent publication no. DE 10 2011 081 836 A1 or International patent publication no. WO 2012/065787 A1, it is known for the components for generating electrical energy to be arranged in a housing which is arranged on the rear-axle member or in a housing which forms the rear-axle member, wherein normally, the rear-axle member and the housing are preassembled together with other components, such as for example the rear-axle differential or the wheel-controlling links of the rear axle, to form a so-called rear-axle module, and are subsequently fastened as a unit to the vehicle body or to a vehicle bodyshell. Here, for reasons relating to acoustics and comfort, the rear-axle module is preferably fastened to the vehicle body by way of four rear-axle member bearings which are received in the rear-axle member and which are in the form of rubber bearings or hydraulically damped bearings.

It is thus an object of the present invention to provide an improved arrangement of a rear-axle module on a vehicle body for a two-axle, two-track vehicle which is at least partially electrically driveable by an electric motor, by means of which arrangement the abovementioned conflict of aims can be better resolved.

Accordingly, a rear-axle module according to the invention is characterized in that it is additionally attachable or connectable to the vehicle body by way of two front bearings which are arranged on the housing in the front region of the rear-axle module, and a two-axle, two-track vehicle according to the invention which is at least partially electrically driveable by an electric motor, and which has a rear-axle module, is characterized in that it has a rear-axle module according to the invention, which is arranged on the vehicle in accordance with the invention.

Here, in the following text, a rear-axle module is to be understood to mean a preassembled unit of parts and/or components, which preassembled unit is, during the assembly process, connected as a unit to the vehicle body or to a vehicle bodyshell.

Here, the rear-axle member is preferably a subframe or of frame-like form and, in a state in which it has been arranged on the vehicle body or vehicle bodyshell, said rear-axle member is arranged in a rear region of the rear-axle module, that is to say, during forward travel of the vehicle, the rear-axle member is arranged toward the vehicle rear end in the vehicle longitudinal direction, wherein the rear-axle member preferably forms the rear region of the rear-axle module. The rear-axle member preferably has two crossmembers, one front and one rear, which extend substantially perpendicular to the vehicle longitudinal direction and which are furthermore preferably connected to one another by way of two longitudinal members which extend substantially in the vehicle longitudinal direction. On the crossmembers themselves, there are preferably provided bearing receptacles for a rear-axle differential, wherein preferably, a 3-point bearing arrangement is provided, with two bearing receptacles in the front crossmember of the rear-axle member and one bearing receptacle in the rear crossmember, wherein, for reasons relating to acoustics and comfort, the rear-axle differential is preferably attachable to the rear-axle member by way of elastic rubber bearings. It is however also possible for an electric motor to be fastened to the rear-axle member. For the fastening of wheel-controlling links, bearing lugs or the like are preferably provided on the rear-axle member.

The housing for receiving components for the provision of electrical energy is in this case arranged, in a state in which it is arranged on the vehicle body or on the vehicle bodyshell, in a front region of the rear-axle module as viewed in the vehicle longitudinal direction during forward travel of the vehicle, that is to say in the direction of the front of the vehicle, and said housing preferably forms, by way of a front part, the front region of the rear-axle module. The rear part of the housing is preferably connected to the rear-axle member. The rear housing part may however also form a part of the rear-axle member, for example the front crossmember, whereby particularly advantageous utilization of the available structural space is made possible.

The housing is preferably at least partially a cast housing, and is in particular designed such that components received therein can be protected against environmental influences, in particular against moisture. Here, the housing may also comprise multiple individual housings and/or be assembled from multiple parts. It is furthermore preferable for the housing to likewise be designed for the connection of wheel-controlling links.

Components for storing electrical energy which can be received in the housing are for example high-voltage storage cells or high-voltage storage cells combined in each case to form high-voltage storage modules, that is to say components which provide a voltage from 200 V to 400 V. It is however also possible for fuel cells with associated accumulators to be received therein, or conventional accumulators, for example one or more conventional 12 V vehicle batteries. In this case, it is advantageous for the associated power electronics to likewise be received in the housing.

For the attachment of the rear-axle module to the vehicle body, two rear-axle member bearings are provided inter alia in the rear end region of the rear-axle module. Said rear-axle member bearings are preferably arranged in the rear corner regions of the rear-axle member, for example in the end regions, in particular at the ends, of the crossmembers or of the longitudinal members of the rear-axle member. The rear-axle member may however also have supporting arms which project obliquely rearward and outward, with the rear-axle member bearings then being arranged at the outer ends of said supporting arms.

Furthermore, in the middle region of the rear-axle module, there are provided two rear-axle member bearings for the connection of the rear-axle module to the vehicle body. In this case, the middle region is not imperatively a region arranged around the geometrical middle which lies in the vehicle longitudinal direction, but is a region which lies between the front region and the rear region as viewed in the vehicle longitudinal direction. In particular, the middle region is a connecting region in which the housing, which is arranged in the front region or which forms the front region, is connected to the rear-axle member, which is arranged in the rear region or which forms the rear region.

What has proven to be particularly advantageous is the use of hydraulically damped rear and middle rear-axle member bearings, in particular rear and middle rear-axle member bearings which are hydraulically damped in the vehicle longitudinal direction.

According to the invention, it is furthermore the case that two front bearings are provided which are arranged on the housing in the front region of the rear-axle module, by which bearings the rear-axle module is attached to the vehicle body. In this way, the oscillatory characteristics of the rear-axle module or of the vehicle, in particular with regard to pitching oscillations, that is to say with regard to oscillations about a vehicle transverse axis (Y axis), can be positively influenced, such that acoustics and in particular comfort can be improved. The additional support of the rear-axle module in its front region furthermore has the effect that the middle rear-axle member bearing is relieved of load, such that the latter can be designed to be of smaller dimensions in relation to the attachment of the rear-axle module only by way of a total of four bearings, as is known from the prior art.

It is preferably the case that the middle rear-axle member bearings, in particular the middle and rear rear-axle member bearings, from a conventional vehicle, that is to say from a vehicle driven only by an internal combustion engine, are carried over for the hybrid variant. This means that, despite the high additional weight arising from the components for storing electrical energy, the rear-axle member bearings do not have to be designed to be of larger dimensions. As a result, further components for the attachment to the vehicle body, such as for example the bearing receptacles on the vehicle body or on the rear axle member, can likewise be carried over. Furthermore, for a hybrid vehicle, no additional structural space is required for the rear-axle member bearing in relation to a conventional vehicle.

By the housing which is integrated in the rear-axle module, it is possible for components received therein to be quickly and easily integrated into the vehicle or arranged on the vehicle body. Furthermore, the available structural space is optimally utilized. Through the possibility of designing the housing to also receive wheel-controlling links or other corresponding parts, it is possible for the attachment points in the case of the hybrid variant to be arranged geometrically identically to those in the conventional vehicle, which allows multiple parts to be carried over, and thus increases the economic viability of the hybrid variant.

Here, it is preferably the case that the two additional front bearings are arranged in the region of a front edge or directly at the front edge of the housing or of the rear-axle module. Here, said bearings are preferably designed and arranged on the housing such that they can be attached to the vehicle body, in particular to the vehicle bodyshell, from below, that is to say they can be supported on the vehicle body from below.

In a particularly preferred refinement of the invention, the rear-axle module is, by way of the two additional front bearings, attached to the vehicle body in the region of a footwell, in particular of a rear footwell, that is to say in particular in the region of the footwell in the rear-seat compartment, in particular in a heel region of the rear footwell. Here, the heel region refers to that region of the rear footwell on the vehicle body or on the vehicle bodyshell which surrounds the heels or the feet of a rear-seat passenger in a normal seating position, that is to say refers to the corresponding part of the floor of the rear footwell and to the rear wall of the footwell below the seat bench, in which a rear-seat passenger places his or her feet. In the case of a vehicle without a rear-seat compartment, for example in the case of a two-seat vehicle, the attachment of the rear-axle module to the vehicle body or to the vehicle bodyshell is preferably correspondingly realized in a rear region of a front footwell, that is to say correspondingly in the rear region of a driver or front passenger footwell, behind the seats.

In a refinement of the invention, the two additional, front bearings arranged on the housing, by means of which bearings the rear-axle module is additionally attached in the front region to the vehicle body, are elastomer bearings. Here, the elastomer bearings are preferably designed to be at least three times as stiff in a z direction, that is to say along the vehicle vertical axis, as in an x direction, that is to say in the vehicle longitudinal direction. In particular, the two front additional bearings have stiffnesses in x, y and z directions which are in a ratio x:y:z of 2:5:7. Said ratio has proven to be particularly advantageous with regard to the conflict of aims in terms of acoustics, comfort and driving dynamics.

In one refinement of the invention, the housing has an upper shell and a lower shell, wherein, when the housing is in an assembled state and the rear-axle module is in a state in which it has been arranged on the vehicle body, a parting joint between the housing upper shell and the housing lower shell preferably runs obliquely downward through the housing from top front to bottom rear as viewed counter to a vehicle longitudinal direction.

In this way, in the case of a housing formed by casting, that is to say in the case of a housing upper shell formed by casting and a housing lower shell formed by casting, the necessary draft angles required for demolding purposes after the casting process are distributed approximately uniformly between the two housing shells, whereby the internal volume of the housing can be enlarged, such that more structural space is available for the components that are to be arranged in the housing.

In a preferred refinement, the middle rear-axle member bearings are integrated into the housing, preferably in the middle region of the rear-axle module, in particular in the connecting region or in a region directly adjacent thereto. Here, in the case of a housing with housing upper shell and housing lower shell, the middle rear-axle member bearings are preferably integrated into the housing upper shell. In this case, the above-described profile of the parting joint has the further advantage that the parting joint runs not through but past the bearing receptacles of the middle rear-axle member bearings.

In a preferred refinement of the invention, the housing is of catamaran-like form and has two housing hulls which are arranged substantially parallel to the vehicle longitudinal direction, wherein one of the two front additional bearings is arranged in each case in the front region of a housing hull.

Here, the housing hulls are preferably connected to one another in the front region and/or in the middle region of the rear-axle module. For the connection of the housing hulls in the front region, provision is preferably made of one or more substantially vertically arranged plates which extend transversely with respect to the vehicle longitudinal direction, whereas a front crossmember of the rear-axle member is preferably provided for the connection of the housing hulls in the middle region and/or at the rear ends thereof.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 4 to 8 show the rear-axle module according to the invention, wherein FIG. 4 is a perspective illustration, FIG. 5 is a view from above, FIG. 6 is a view from below, FIG. 7 is a view from the front, and FIG. 8 is a view from the rear.

DETAILED DESCRIPTION OF THE DRAWINGS

Figure 1:
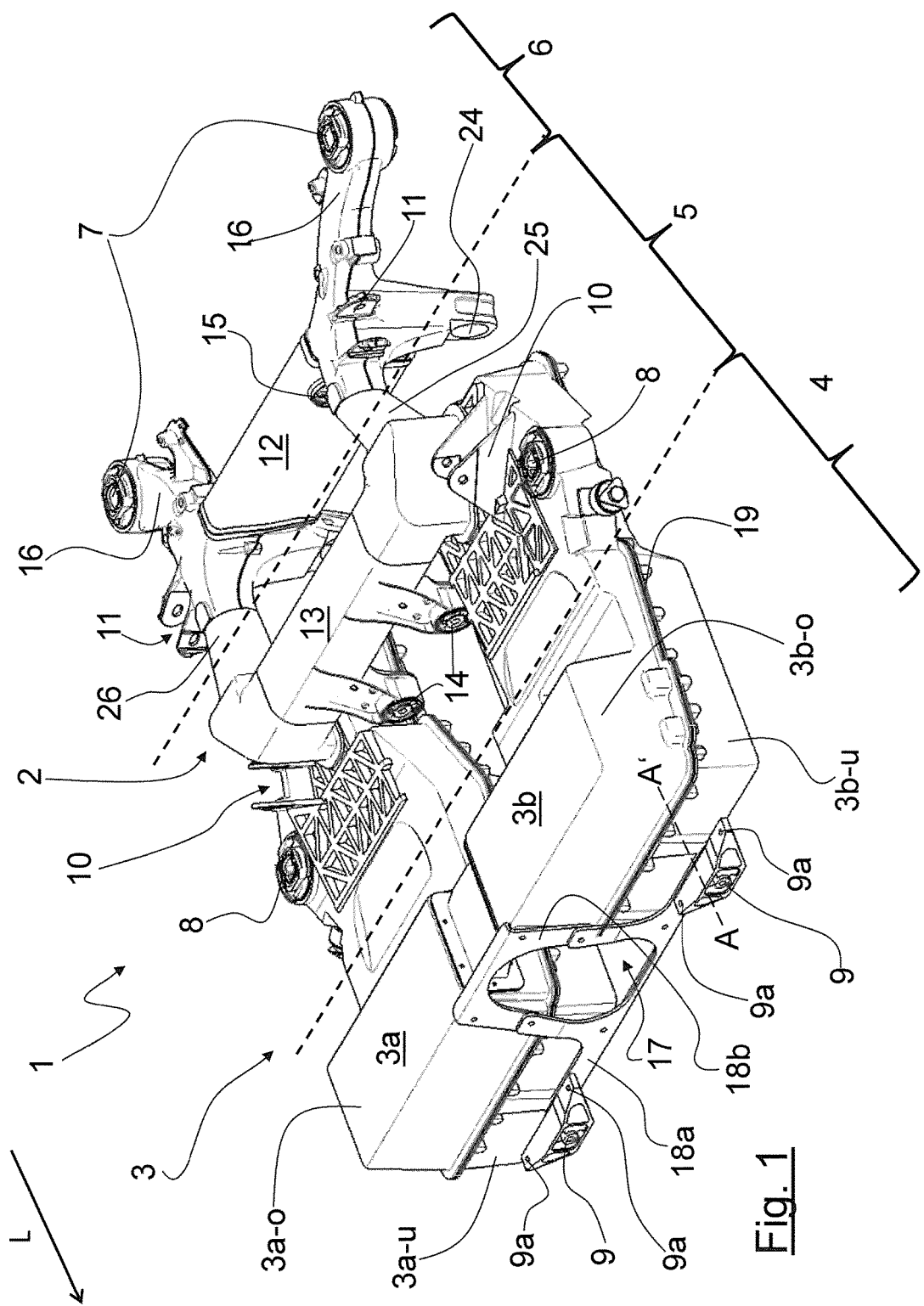
FIG. 1 shows a first exemplary embodiment of a rear-axle module according to the invention in a perspective illustration.

FIG. 1 shows a rear-axle module 1 according to the invention for a vehicle body of a hybrid vehicle, that is to say of a vehicle which is at least partially driveable by an electric motor. Said rear-axle module 1 according to the invention has a rear-axle member 2 with a subframe which comprises two crossmembers 12 and 13 and two longitudinal members 25, 26. Here, the rear-axle member 2 forms a rear region 6 of the rear-axle module 1 in relation to a vehicle longitudinal direction L. A front region 4 of the rear-axle module 1 is formed by a housing 3, wherein the housing 3 and the rear-axle member 2 are connected to one another in a connecting region which is a part of a middle region 5 of the rear-axle module 1.

The rear-axle member 1 is designed for the fastening of wheel-controlling links, and for this purpose, has corresponding bearing lugs 11 or corresponding bearing receptacles 24, wherein the bearing lugs 11 are in this case provided for the attachment of a transverse link, and the receptacles 24 are provided for the attachment of a camber link.

For the connection of the rear-axle module 1 to a vehicle body, the rear-axle member 2 in this exemplary embodiment has two rear supporting arms 16 which extend rearward in a vehicle longitudinal direction L and outward. On the outer ends of the arms 16 there are arranged two rear, cylindrical rear-axle member bearings 7 which are hydraulically damped in the vehicle longitudinal direction L and by which the rear-axle module 1 can be attached, and in an arrangement according to the invention is attached, to the vehicle body.

Furthermore, in the exemplary embodiment illustrated, the rear-axle module 1 has a housing 3 composed of die-cast aluminum, which housing comprises two housing hulls 3a and 3b, which each have a housing upper shell 3a-o and 3b-o and a housing lower shell 3a-u and 3b-u.

The two housing hulls 3a and 3b are of L-shaped form and are arranged substantially parallel to the vehicle longitudinal direction L or in the manner of a catamaran, wherein, in the middle between the two housing hulls 3a, 3b, there is a structural space provision 17 for an exhaust system and/or an articulated shaft, wherein, in an assembled state, the housing hulls 3a, 3b are each arranged in the rear-axle module in the manner of a letter L lying on its back with the bottom side facing forward, such that structural space for a rear-seat compartment seat bench, that is to say a rear seat bench, is provided in the regions thereby left free above the housing hulls 3a, 3b.

The housing shells 3a-o and 3b-o and 3a-u and 3b-u are in this case connected to one another along a parting joint 19, in particular by screw connection. For the exact positioning of the housing shells 3a-o and 3b-o and 3a-u and 3b-u relative to one another, corresponding dowel pins may be provided in the flange region. The housing 3 or the two housing hulls 3a and 3b are likewise designed for the fastening of wheel-controlling links and, for this purpose, have corresponding bearing lugs 10, wherein the bearing lugs 10 are in this case provided for the attachment of a control link, that is to say of a transverse link which controls a rear wheel.

To increase the stability or the stiffness of the rear-axle module 1 or of the housing 3, the two housing hulls are connected to one another in the front region 4 and in a middle region 5, wherein the two housing hulls 3a, 3b are connected to one another in the front region 4, at their front edge, by way of a two-part plate 18a, 18b, which will hereinafter be referred to as connecting traverse 18a, 18b.

In the middle region 5 of the rear-axle module, the rear-axle member 2 is connected, at the ends of the front crossmember 13, to the housing 3, in particular to the rear ends of the housing hulls 3a, 3b. In this middle region 5, two middle rear-axle member bearings 8 are integrated into the housing 3 of the rear-axle module, more specifically in each case into the housing upper shells 3a-o and 3b-o of the housing hulls 3a and 3b, which is particularly advantageous as, in this way, the parting joint 19 does not run through the bearing receptacles for the middle rear-axle member bearings 8.

The rear-axle member 2 is furthermore designed for receiving or mounting a rear-axle differential (not illustrated here) and has, on the front crossmember 13, two front rear-axle differential bearing receptacles 14 and, arranged on the rear crossmember 12, a rear rear-axle differential bearing receptacle 15, such that three-point mounting of the rear-axle differential is possible. Here, the bearing attachment is, for reasons relating to acoustics and comfort, preferably likewise realized by way of elastic bearings, in particular by way of rubber bearings or elastomer bearings.

According to the invention, the rear-axle module 1 additionally has two front bearings 9 arranged in the front region 4 of the rear-axle module 1, by which bearings the rear-axle module 1 can be attached to the vehicle body. In this exemplary embodiment, the two bearings 9 are arranged on a front edge of the housing 3 or of the housing hulls 3a and 3b, more precisely in each case on the front side of the housing lower shells 3a-u and 3b-u. Here, in this exemplary embodiment, the two bearings 9 are fastened to the rear-axle module 1, or as described above to the housing 3 of the rear-axle module 1, in each case by an approximately horizontally running screw connection (not visible in the illustration) arranged in the middle. A screw connection is likewise provided for the attachment to the vehicle body or to the vehicle bodyshell. For this purpose, in this case, each bearing 9 has two screw-connection points 9a, wherein said screw connections run approximately vertically, that is to say upward from the bearings 9, as in this exemplary embodiment, the rear-axle module 1 is, at all six attachment points 7, 8 and 9, attached or connected or fastened to the vehicle body or to the vehicle bodyshell from below. As can be clearly seen in FIG. 1, the two additional, front elastomer bearings 9 are of trapezoidal form, wherein the bearings 9 are each arranged with their base side, that is to say the longer of the two main sides, facing upward, that is to say toward the vehicle body. In this way, improved support on the vehicle body can be realized. In this exemplary embodiment, the two elastomer bearings 9 each have stiffnesses in an x direction (vehicle longitudinal direction L) of approximately 200 N/mm, in a y direction (vehicle transverse direction) of approximately 500 N/mm and in a z direction (vehicle vertical direction) of approximately 700 N/mm, that is to say in a ratio x:y:z=2:5:7, wherein the stiffness in the z direction amounts to more than three times the stiffness in the x direction. Said stiffness ratio has proven to be particularly advantageous with regard to the conflict of aims with regard to acoustics, driving dynamics and comfort.

Figure 2:
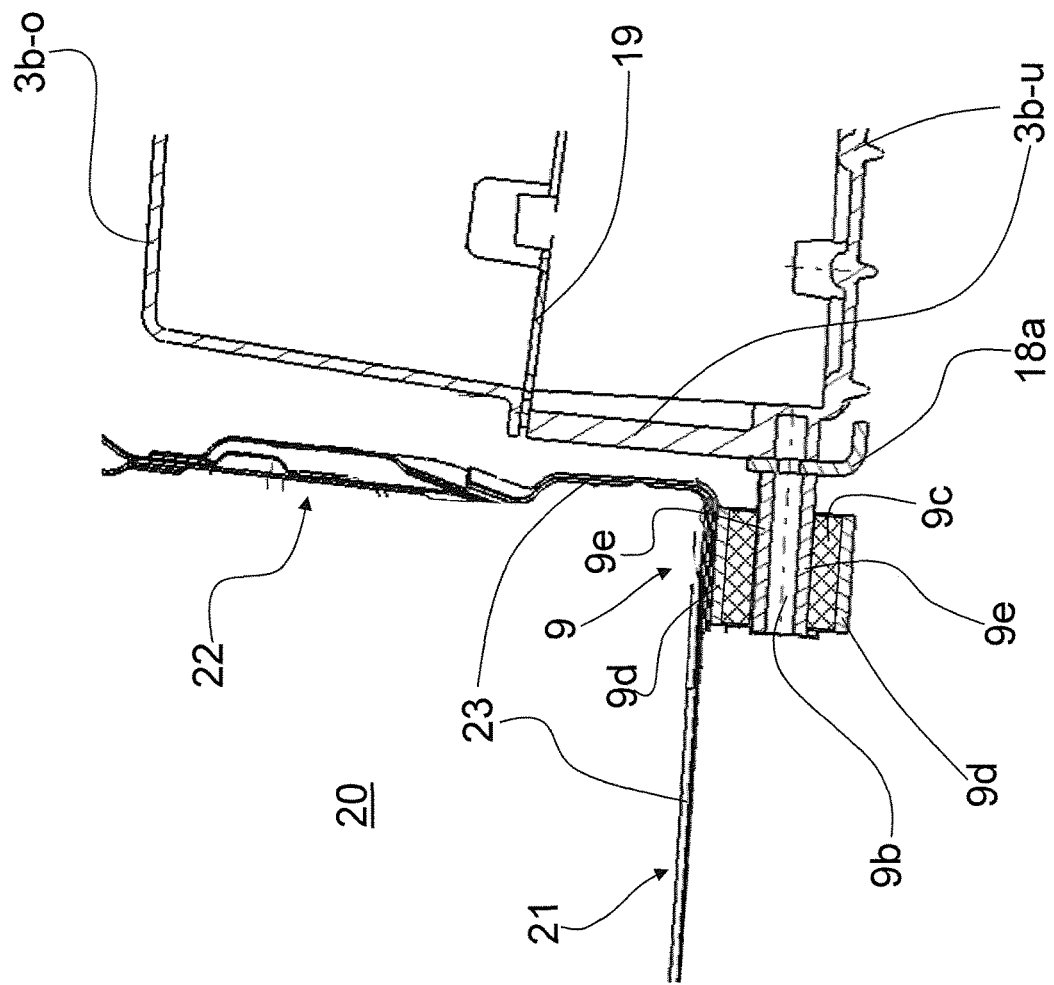
FIG. 2 shows, in a sectional illustration, a detail of an arrangement according to the invention of a rear-axle module according to the invention on the vehicle body.

FIG. 2 shows a detail of a sectional illustration along the section A-A' (cf. FIG. 1) through the left-hand front additional bearing 9 of an arrangement according to the invention of a rear-axle module 1 on the vehicle body, wherein, in this illustration, the configuration of the attachment of the rear-axle module 1 or of the housing 3 to the vehicle body is shown on the basis of the example of the left-hand front bearing 9. The right-hand additional front bearing 9 is designed correspondingly, and is also fastened correspondingly to the housing 3 or to the vehicle body.

As has already been discussed above, the bearing 9 is an elastomer bearing which has an externally situated bearing housing 9d, an inner bushing 9e and interposed rubber or an elastomer 9c. Here, the bearing 9 is attached or fastened by way of the lower connecting traverse 18a to the housing 3, more precisely to the housing lower shell 3b-u. Here, the fastening is realized by way of a screw connection, wherein, in this illustration, only the screw provision 9b is shown, not the screw itself.

Furthermore, the bearing 9 is attached to the vehicle body by way of the screw-connection points 9a (see FIG. 1) which are not visible in this illustration. In the exemplary embodiment shown, the bearing 9 is attached or fastened to a so-called "heel plate" 23, that is to say to a plate which delimits a rear footwell 20 in a rearward direction and in particular in a downward direction or to a corresponding plate assembly, that is to say to a "heel plate" formed from multiple plates, for example with additional reinforcement plates. Here, the "heel plate" 23 forms a rear wall 22 of the rear footwell 20 and the floor 21 of said footwell 20. Here, the bearing 9 is fastened to the "heel plate" 23 from below, wherein the "heel plate" 23 lies with its bottom side on the bearing 9, more precisely on the relatively long main side, arranged so as to face upward, of the trapezoidal bearing 9.

Figure 3:
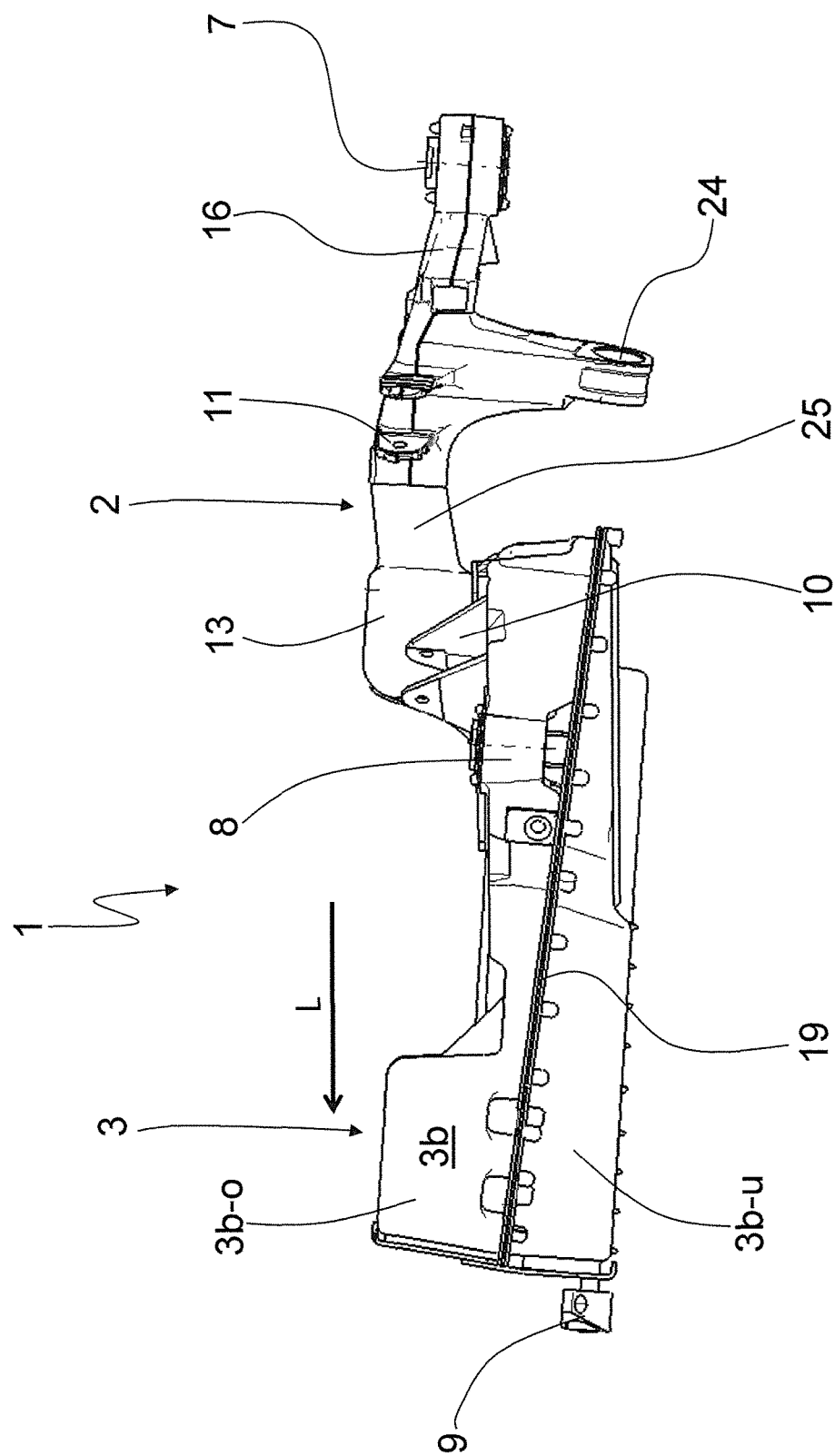
FIG. 3 shows the rear-axle module according to the invention from FIG. 1 in a side view from the left.

FIG. 3 shows the rear-axle module according to the invention from FIG. 1 in a view from the left in relation to the vehicle longitudinal direction L. In this illustration, the profile of the parting joint 19 obliquely downward from the front to the rear in the housing 3 or in the housing hull 3b can be clearly seen. In particular, it can be clearly seen that the parting joint 19 does not run through the middle rear-axle bearing 8, but is fully integrated into the housing upper shell 3b-o. Said profile of the parting joint 19 is furthermore advantageous with regard to the structural space that must be provided for the draft angles of the housing shells, as has already been discussed above.

Furthermore, the left-hand front additional bearing 9 and the left-hand bearing lug 10 on the housing hull 3b for the fastening of wheel-controlling links, the left-hand bearing lug 11 on the rear-axle member 2 for the fastening of further wheel-controlling links, the left-hand receptacle 24, which is likewise designed for the fastening of a wheel-controlling link, and the left-hand rear rear-axle member bearing 7, which is arranged on the rear or rear outer end of the rear-axle member 2, in particular in the corner region of the supporting arm 16, can be clearly seen.

Figure 4:
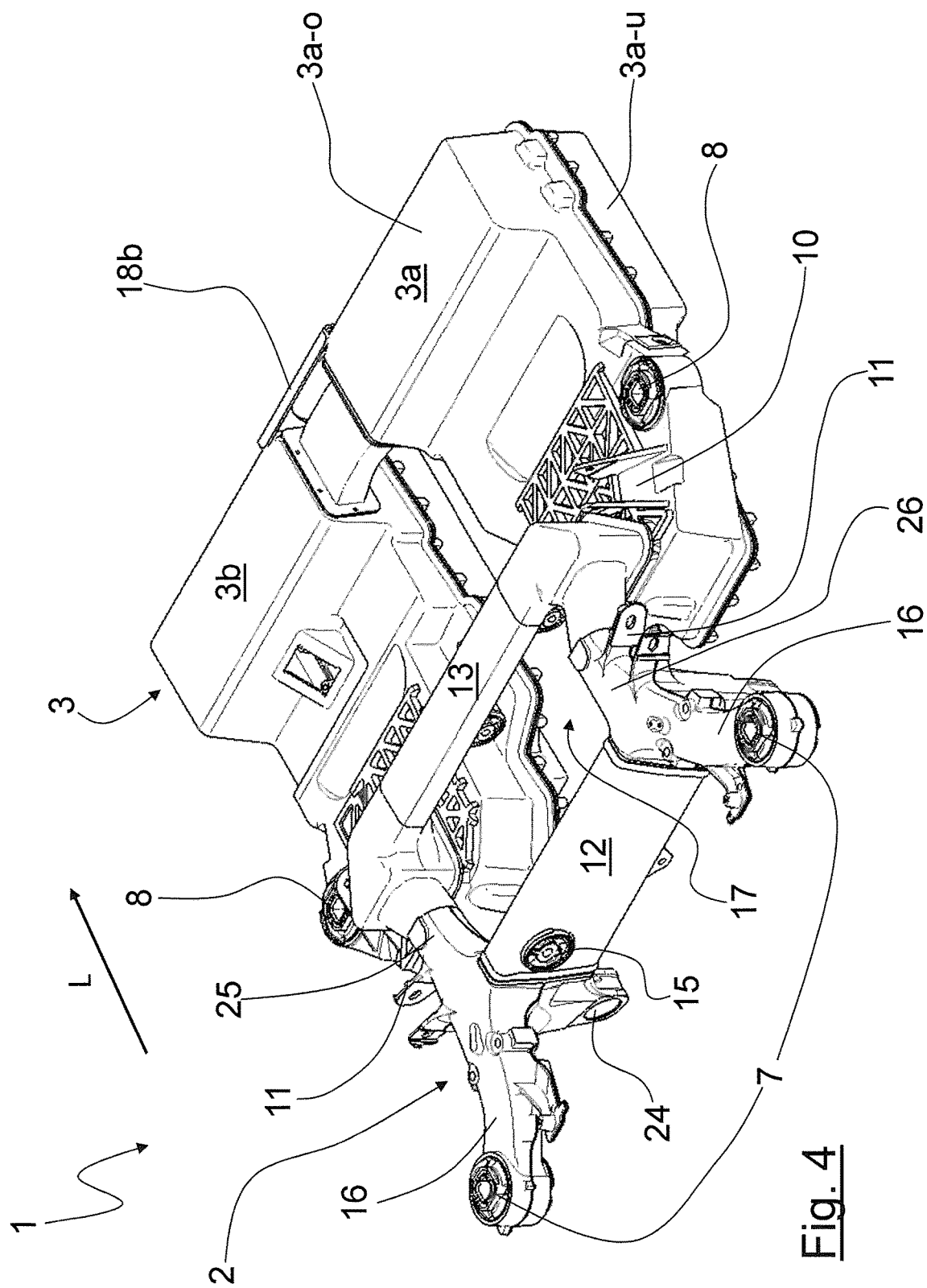
Figure 5:
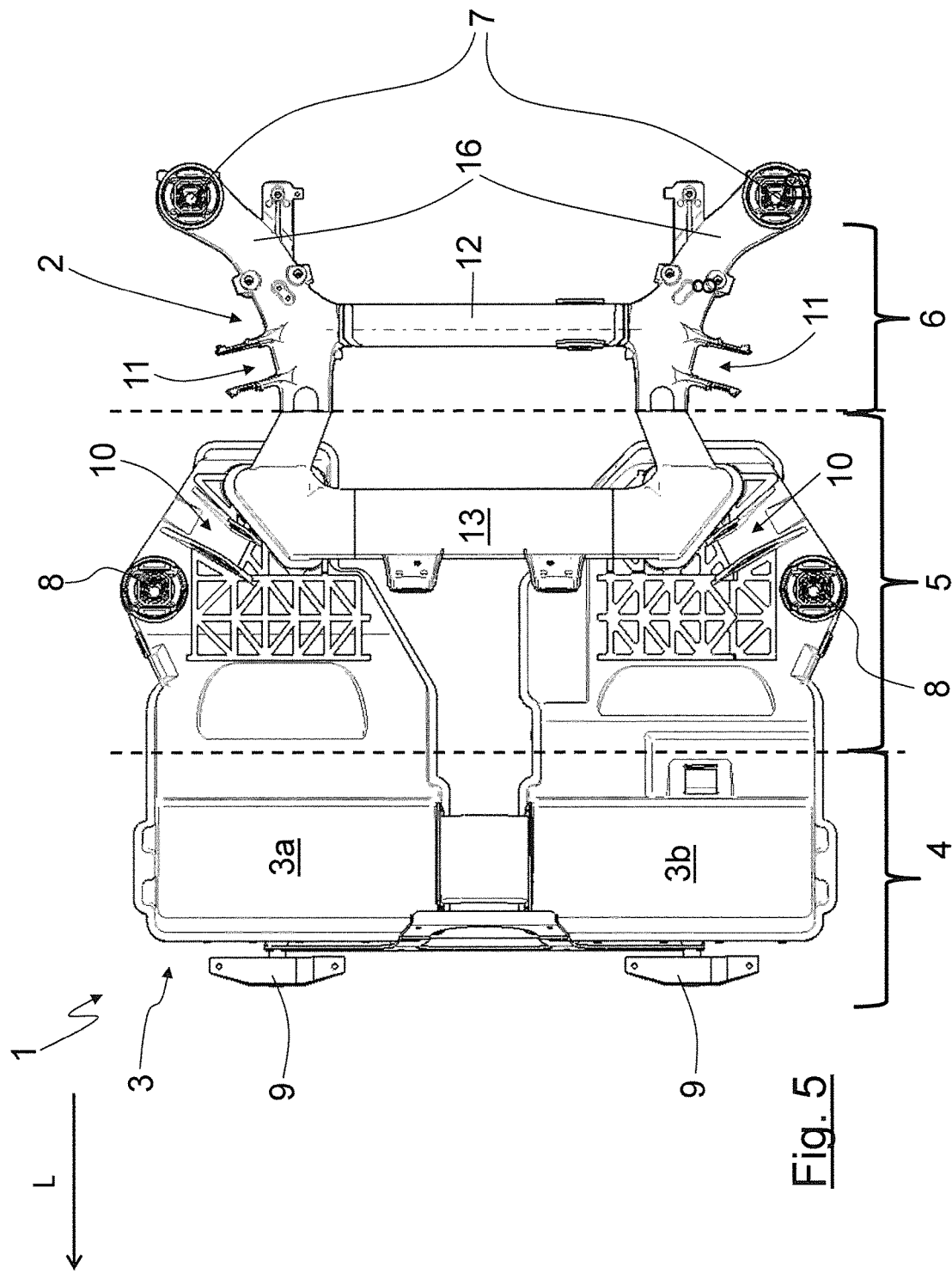

For better understanding, FIG. 4 shows the rear-axle module 1 according to the invention from FIGS. 1 and 3 additionally in another perspective illustration, and FIG. 5 shows a view from above, wherein, in FIG. 5, the three regions 4, 5 and 6, that is to say the front region 4, the middle region 5 and the rear region 6 of the rear-axle member module 1, can be clearly seen. The division or separation into said three regions 4, 5 and 6 should not in this case be understood to mean that the rear-axle module 1 is divided in length into three regions of uniform length or width, it rather being possible for the middle region 5 in particular to extend to a greater or lesser extent in the vehicle longitudinal direction L. Here, the front region 4 is defined as the region which, in a state in which the rear-axle module 1 is mounted on the vehicle body, is situated furthest forward in the vehicle longitudinal direction L in the forward direction of travel and which forms the front edge of the rear-axle module. Correspondingly, the rear region 6 is the region situated furthest toward the rear. The middle region 5 is the region situated in between, that is to say the region situated between the front region 4 and the rear region 6 as viewed in the vehicle longitudinal direction L. In particular, a connecting region in which the rear-axle member 2 is connected to the housing 3 is arranged in the middle region 5.

Figure 6:
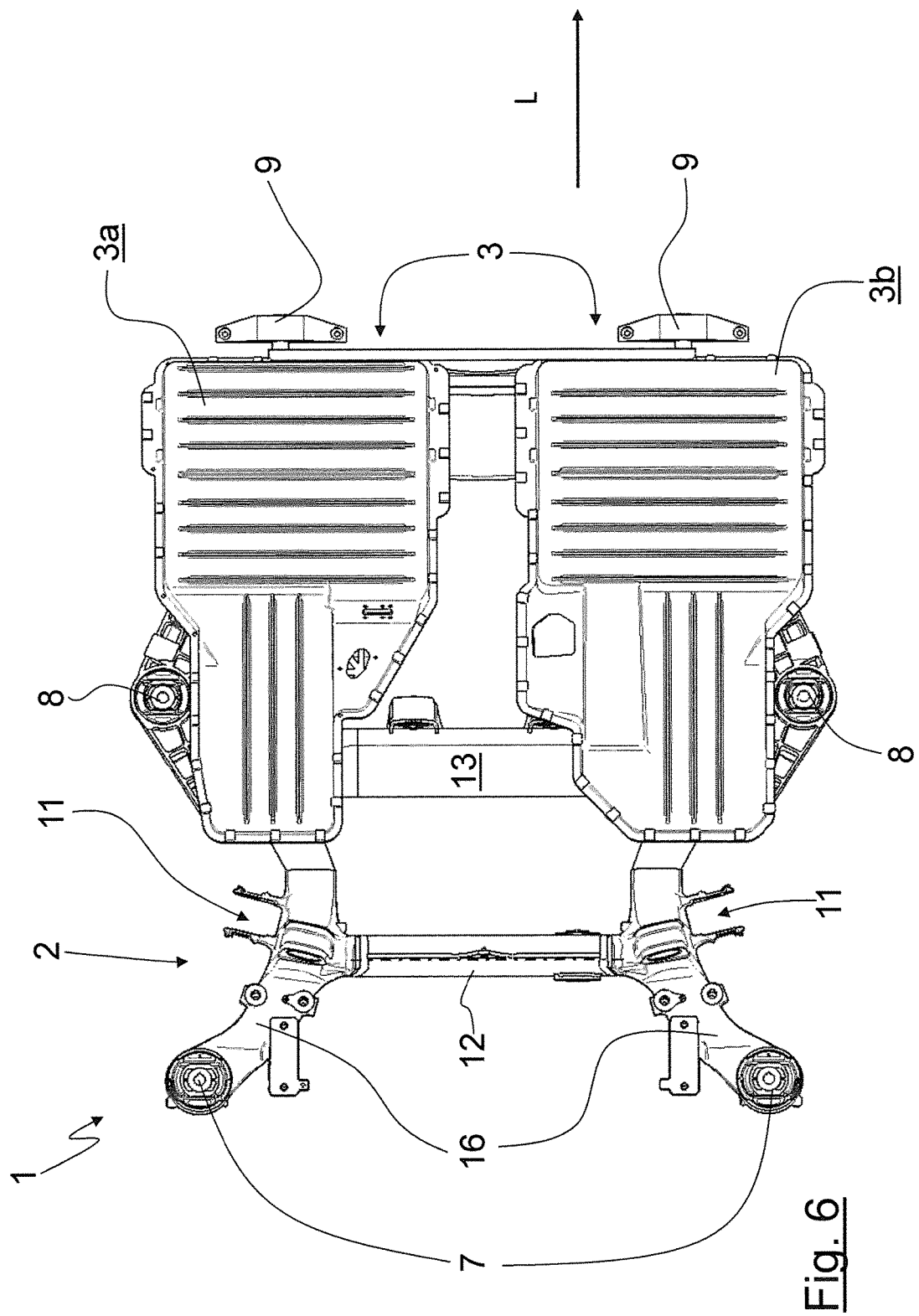
Figure 7:
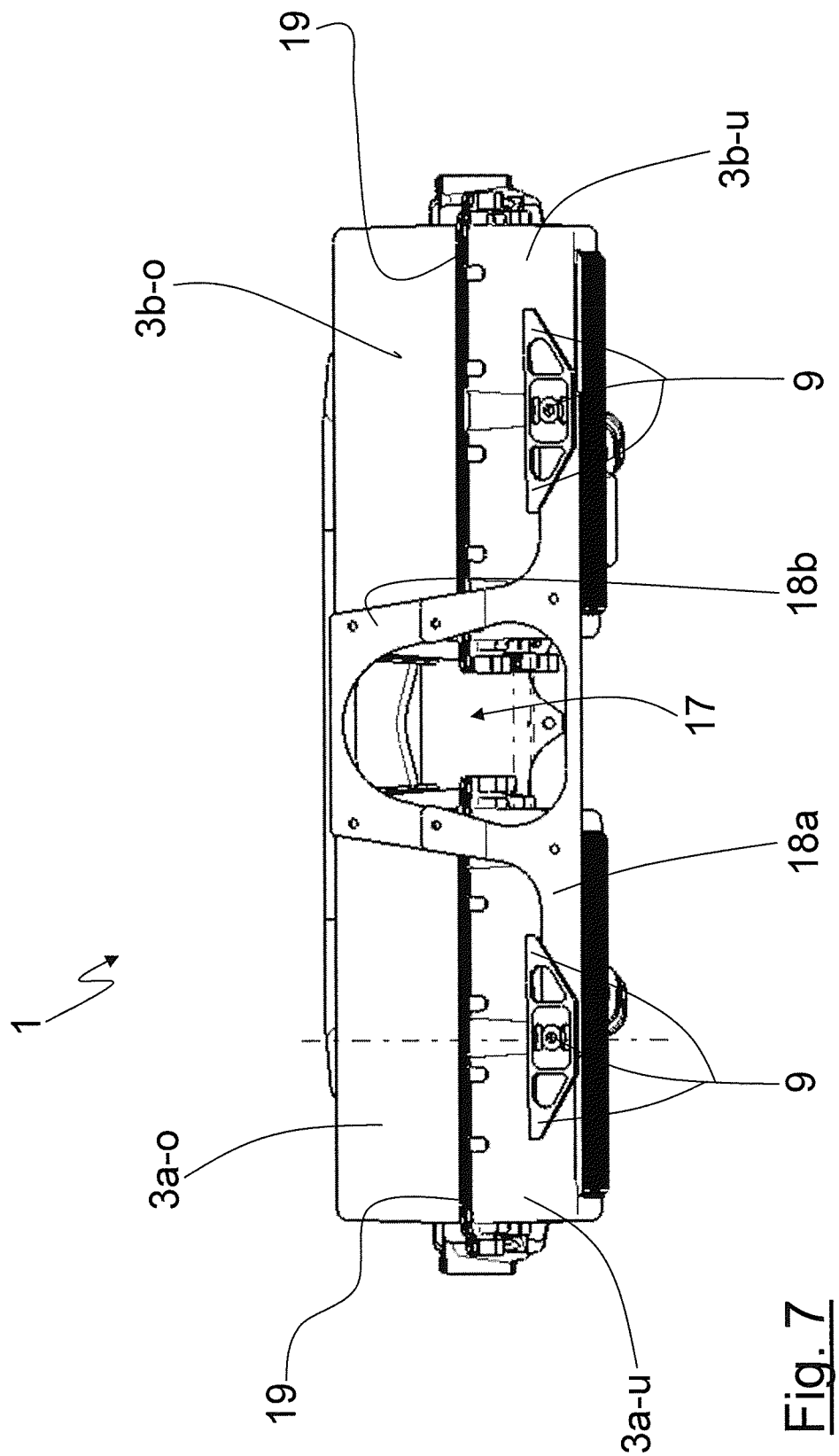
Figure 8:
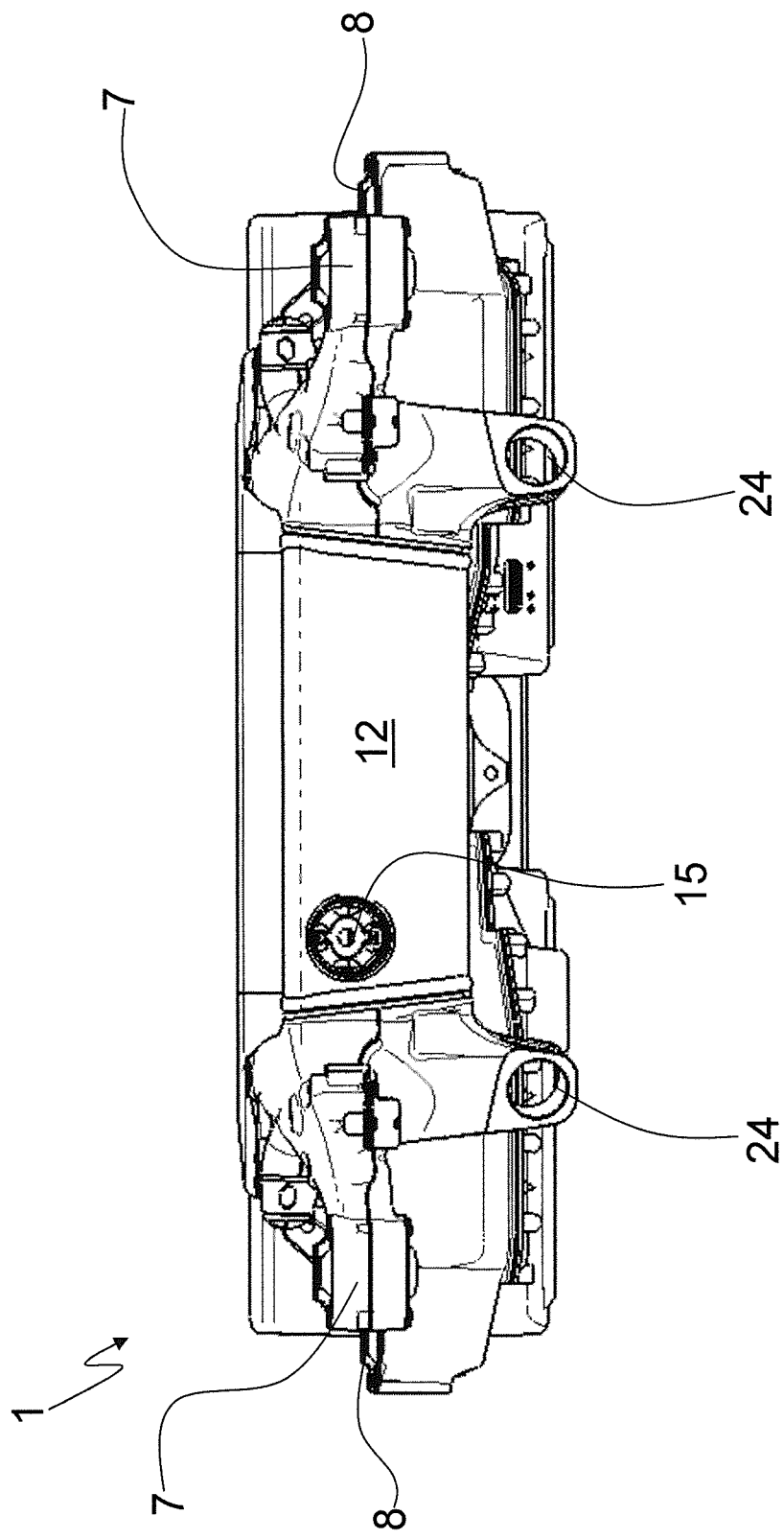

For the sake of completeness, FIG. 6 shows the rear-axle module 1 according to the invention from FIGS. 1, 3, 4 and 5 in a view from below and FIG. 7 shows said rear-axle module in a view from the front, wherein, in FIG. 7 in particular, the structural space provision 17 in the bottom connecting traverse 18a and top connecting traverse 18b and between the two housing hulls 3a, 3b for the exhaust system and/or the articulated shaft can be clearly seen. For the sake of completeness, FIG. 8 also shows the rear-axle module 1 according to the invention from FIGS. 1 and 3 to 7 in a view from the rear.

A multiplicity of modifications, in particular structural modifications, to the exemplary embodiment discussed is self-evidently possible without departing from the content of the patent claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Rear-axle module
2 Rear-axle member
3 Housing
3a, 3b Housing hull
3a-o, 3b-o Housing upper shell
3a-u, 3b-u Housing lower shell
4 Front region of the rear-axle module
5 Middle region of the rear-axle module
6 Rear region of the rear-axle module
7 Rear rear-axle member bearing
8 Middle rear-axle member bearing
9 Front, additional bearing
9a Screw connection points of the bearing 9
9b Screw provision
9c Rubber/elastomer of the bearing 9
9d Bearing housing of the bearing 9
9e Inner bushing of the bearing 9
10 Bearing lug on housing (for control links)
11 Bearing lug on rear-axle member (for transverse links)
12 Crossmember, rear
13 Crossmember, front
14 Front rear-axle differential bearing
15 Rear rear-axle differential bearing
16 Supporting arm
17 Structural space provision
18a Connecting traverse, bottom
18b Connecting traverse, top
19 Parting joint
20 Rear footwell
21 Floor of the rear footwell
22 Rear wall of the rear footwell
23 Heel plate
24 Bearing receptacle (for camber links)
25 Longitudinal member, left
26 Longitudinal member, right

What is claimed is:

1. A rear-axle module for a two-axle, two-track vehicle which is at least partially electrically driveable by an electric motor, comprising:

a rear-axle member configured to receive wheel-controlling links of a rear axle; and
a housing configured to receive electrical energy-generating components,
wherein
the housing is arranged in a front region of the rear-axle module, the front region facing in a forward vehicle travel direction when the rear axle module is in an installed position on the vehicle,
the housing is at least one of connected to and integrated with the rear-axle member,
the rear-axle module is configured to be attached to the vehicle by
two rear-axle member bearings arranged in a rear region of the rear-axle module opposite the front region,
two middle rear-axle member bearings arranged in a middle region of the rear-axle module between the front and rear regions, and
two front bearings arranged on the housing in the front region,
the housing has an upper shell and a lower shell,
the housing is formed with two housing hulls arranged substantially parallel to the forward vehicle direction when the rear-axle module is in the installed position in the vehicle,
each of the two housing hulls includes one of the two front bearings, and
at least one of the wheel-controlling links is located behind the housing in the rear region.

2. The rear-axle module as claimed in claim 1, wherein the rear-axle module is further configured to be attached to the vehicle by the two front bearings arranged on the housing and configured to be attached to the vehicle in a rear footwell region of the vehicle.

3. The rear-axle module as claimed in claim 2, wherein the two front bearings arranged on the housing are elastomer bearings.

4. The rear-axle module as claimed in claim 3, wherein a stiffness of the two front bearings in a z direction is at least three times a stiffness of the two front bearings in an x direction.

5. The rear-axle module as claimed in claim 4, wherein a ratio of the stiffness of the two front bearings in the x direction, a stiffness of the two front bearings in a y direction and the stiffness of the two front bearings in the z direction is 2:5:7.

6. The rear-axle module as claimed in claim 1, wherein the middle rear-axle member bearings are integrated into the housing.

7. The rear-axle module as claimed in claim 3, wherein the middle rear-axle member bearings are integrated into the housing.

8. A vehicle including the rear-axle module of claim 1.

9. The vehicle as claimed in claim 8, further comprising: an electric motor arranged on the rear-axle module to partially electrically drive the vehicle.

10. The rear-axle module as claimed in claim 3, wherein when the rear-axle module is in the installed position on the vehicle, a parting joint between the housing upper and lower shells is oriented obliquely downward along the housing from a top front of the housing to a bottom rear of the housing.

* * * * *